(12) United States Patent
Seyrek Pierre et al.

(10) Patent No.: US 12,725,351 B2
(45) Date of Patent: Sep. 1, 2026

(54) GENERATING THREE-DIMENSIONAL SKELETON REPRESENTATIONS OF AQUATIC ANIMALS USING MACHINE LEARNING

(71) Applicant: FISHENCY INNOVATION AS, Stavanger (NO)

(72) Inventors: Emek Seyrek Pierre, Sevres (FR); Mustafa Furkan Kirac, Istanbul (TR)

(73) Assignee: FISHENCY INNOVATION AS, Stavanger (NO)

( * ) Notice: Subject to any disclaimer, the term of this patent is extended or adjusted under 35 U.S.C. 154(b) by 197 days.

(21) Appl. No.: 18/030,215

(22) PCT Filed: Oct. 4, 2021

(86) PCT No.: PCT/NO2021/050202
§ 371 (c)(1),
(2) Date: Apr. 4, 2023

(87) PCT Pub. No.: WO2022/075853
PCT Pub. Date: Apr. 14, 2022

(65) Prior Publication Data
US 2024/0029347 A1 Jan. 25, 2024

(30) Foreign Application Priority Data
Oct. 5, 2020 (NO) .................................... 20201081

(51) Int. Cl.
*G06T 17/00* (2006.01)
*G06T 7/00* (2017.01)
(Continued)

(52) U.S. Cl.
CPC ................ *G06T 17/00* (2013.01); *G06T 7/73* (2017.01); *G06T 7/97* (2017.01); *G06T 11/00* (2013.01);
(Continued)

(58) Field of Classification Search
CPC .. G06T 17/00; G06T 7/73; G06T 7/97; G06T 11/00; G06T 2200/08; G06T 2207/10016;
(Continued)

(56) References Cited

U.S. PATENT DOCUMENTS 9,355,306 B2 * 5/2016 Wu ........................ G06V 40/23
10,460,512 B2 10/2019 Chen
(Continued)

FOREIGN PATENT DOCUMENTS

JP 2003250382 A * 9/2003
JP WO2019198611 A1 * 2/2021 ............... G06T 7/00
(Continued)

OTHER PUBLICATIONS

Sture et al., A 3D machine vision system for quality grading of Atlantic salmon, Computers and Electronics in Agriculture, vol. 123, Apr. 2015, pp. 142-148 (Year: 2016).*
(Continued)

*Primary Examiner* — Motilewa Good-Johnson
(74) *Attorney, Agent, or Firm* — Birch, Stewart, Kolasch & Birch, LLP

(57) ABSTRACT

A method in a computer system for generating a three-dimensional skeleton representation of an aquatic animal in an aquatic environment. The method includes obtaining one or more 2D images of the aquatic animal from one or more cameras configured to observe the aquatic environment, processing image data from the obtained 2D images to identify key points on or inside the aquatic animal and determine their locations in the 2D images, generating 2D skeletons represented as nodes connected by edges, wherein each node in a 2D skeleton corresponds to one identified key point. From the 2D skeletons estimated 3D position for nodes in the 2D skeletons are calculated, and from the estimated 3D positions, a 3D skeleton of nodes connected by
(Continued)

edges is generating. The generated 3D skeleton may be stored or transmitted as a data structure.

24 Claims, 7 Drawing Sheets

(51) Int. Cl.

| | |
|---|---|
| ***G06T 7/73*** | (2017.01) |
| ***G06T 11/00*** | (2026.01) |
| ***G06V 10/22*** | (2022.01) |
| ***G06V 10/25*** | (2022.01) |
| ***G06V 10/44*** | (2022.01) |
| ***G06V 20/05*** | (2022.01) |
| ***G06V 40/20*** | (2022.01) |

(52) U.S. Cl.

CPC .............. *G06V 10/22* (2022.01); *G06V 10/25* (2022.01); *G06V 10/44* (2022.01); *G06V 20/05* (2022.01); *G06V 40/20* (2022.01); *G06T 2200/08* (2013.01); *G06T 2207/10016* (2013.01); *G06T 2207/20081* (2013.01)

(58) Field of Classification Search

CPC . G06T 2207/20081; G06T 2207/20084; G06T 7/12; G06T 7/162; G06T 7/62; G06T 7/0012; G06T 7/10; G06T 2207/20044; G06V 10/22; G06V 10/25; G06V 10/44; G06V 20/05; G06V 40/20; Y02A 40/81; A01K 61/90

See application file for complete search history.

(56) References Cited

U.S. PATENT DOCUMENTS

| | | | | |
|---|---|---|---|---|
| 10,534,967 | B2 * | 1/2020 | Atwater | A01K 29/005 |
| 10,599,922 | B2 * | 3/2020 | James | G06T 7/593 |
| 10,916,046 | B2 * | 2/2021 | Guay | G06T 13/40 |
| 11,010,896 | B2 * | 5/2021 | Kamiyama | G06N 3/045 |
| 11,284,041 | B1 * | 3/2022 | Bergamo | G06T 7/251 |
| 11,688,136 | B2 * | 6/2023 | Papandreou | G06N 3/08 345/419 |
| 12,198,473 | B2 * | 1/2025 | Barton | G06T 7/11 |
| 2006/0018197 | A1 * | 1/2006 | Burczynski | A01K 61/95 367/87 |
| 2008/0137104 | A1 | 6/2008 | Lillerud et al. | |
| 2012/0162217 | A1 * | 6/2012 | Lim | G06T 19/00 345/419 |
| 2013/0195330 | A1 * | 8/2013 | Kim | G06V 40/10 382/128 |
| 2014/0125663 | A1 * | 5/2014 | Zhang | G06T 7/13 345/420 |
| 2014/0285517 | A1 * | 9/2014 | Park | G06T 13/40 345/632 |
| 2014/0334670 | A1 * | 11/2014 | Guigues | G06V 10/426 382/103 |
| 2016/0147308 | A1 * | 5/2016 | Gelman | G06F 3/04845 345/156 |
| 2017/0046868 | A1 * | 2/2017 | Chernov | G06T 7/246 |
| 2017/0330341 | A1 * | 11/2017 | Butterworth | G01B 11/02 |
| 2017/0337732 | A1 * | 11/2017 | Tamersoy | G06V 40/103 |
| 2018/0139436 | A1 * | 5/2018 | Yücer | H04N 13/106 |
| 2020/0027231 | A1 * | 1/2020 | Kitagawa | G06T 7/001 |
| 2020/0068858 | A1 * | 3/2020 | Ayers | F03B 13/14 |
| 2020/0193591 | A1 * | 6/2020 | Kamiyama | G06T 7/60 |
| 2020/0267947 | A1 | 8/2020 | Krossli | |
| 2020/0394811 | A1 | 12/2020 | Kitagawa et al. | |
| 2021/0072017 | A1 * | 3/2021 | Kitagawa | G01B 11/14 |
| 2021/0312236 | A1 * | 10/2021 | Goncharov | G06N 20/00 |
| 2022/0245555 | A1 | 8/2022 | Prytz et al. | |
| 2022/0392099 | A1 * | 12/2022 | Guay | G06N 3/084 |

FOREIGN PATENT DOCUMENTS

| | | | | |
|---|---|---|---|---|
| NO | 20190760 | A1 | 12/2020 | |
| WO | WO2019/147346 | A1 | 8/2019 | |
| WO | WO 2019/172363 | A1 | 9/2019 | |
| WO | WO-2019198611 | A1 * | 10/2019 | A01K 61/00 |
| WO | WO 2020/023467 | A1 | 1/2020 | |
| WO | WO 2020/046523 | A1 | 3/2020 | |
| WO | WO 2020/134255 | A1 | 7/2020 | |

OTHER PUBLICATIONS

Shafait et al., Towards automating underwater measurement of fish length: a comparison of semi-automatic and manual stereo-video measurements, ICES Journal of Marine Science, vol. 74, Issue 6, Jul.-Aug. 2017, pp. 1690-1701 (Year: 2017).*

Saberioon et al., Application of machine vision systems in aquaculture with emphasis on fish: state-of-the-art and key issues. Rev Aquacult, 9: 369-387. (Year: 2017).*

Entem et al., "Modeling 3D Animals From a Side-View Sketch" Computers & Graphics, vol. 45, 2015 (Available online Ocober 8, 2014), pp. 221-230.

International Search Report for International Application No. PCT/NO2021/050202, dated Jan. 21, 2022.

Norwegian Search Report for Norwegian Application No. 20201081, dated May 5, 2021, with English translation.

Qian et al., "Feature Point Based 3D Tracking of Multiple Fish From Multi-View Images" PLOS ONE, vol. 12, No. 6, Jun. 30, 2017, pp. 1-18.

* cited by examiner

GENERATING THREE-DIMENSIONAL SKELETON REPRESENTATIONS OF AQUATIC ANIMALS USING MACHINE LEARNING

TECHNICAL FIELD

The present invention relates to a system and a method of identification, description and annotation of key-points associated with an aquatic animal such as a fish. In particular, the invention relates to identification of such key-points in order to facilitate estimation of aspects related to the growth, behavior, or health of aquatic animals such as fish.

BACKGROUND

Aquaculture is becoming an economically important industry in many parts of the world. In addition, aquaculture is now the world's fastest growing food production industry. However, the rapid growth raises challenges related to animal health, animal welfare, and the environment. In order to meet these challenges, it becomes necessary to monitor fish and other aquatic animals that are farmed, and this monitoring must be scalable. Current regulations often mandate manual inspection of animals, something that is inefficient both in terms of resources used and in terms of results obtained. As an example, the industry standard for counting of salmon lice requires manual counting of lice every 7th day, in at least half of the fish cages at a location, by counting the number of lice on at least 20 randomly selected fish from each cage. These regulations are likely to become even stricter over time. Personnel performing such counts must receive sufficient training to ensure correct counting of lice in different stages of development. Similar inefficient procedures are used for estimation of growth, observation of behavior, and environmental impact.

Consequently, there is a need for more efficient methods of monitoring various aspects of growth, behavior, and health of aquatic animals raised in aquaculture facilities.

SUMMARY OF THE DISCLOSURE

In order to meet at least some of these needs, a method has been provided for generating a three-dimensional skeleton representation of an aquatic animal in an aquatic environment. In a first embodiment the method comprises obtaining one or more 2D images of the aquatic animal from one or more cameras configured to observe the aquatic environment, processing image data from one or more of the obtained 2D images to identify key points on or inside the aquatic animal, including occluded key points, and determine their locations in the one or more 2D images, and generating one or more 2D skeletons represented as nodes connected by edges. Each node in a 2D skeleton corresponds to one identified key point. For the nodes in the one or more 2D skeletons, estimated 3D positions are calculated, and from the estimated 3D positions of the nodes of the one or more 2D skeletons, 3D coordinates of the nodes of 3D skeleton are determined and a 3D skeleton is generated as a pre-defined structure of nodes connected by edges. The 3D skeleton can be stored as a data structure including the structure of nodes are connected by edges, or such a data structure can be transmitted to be stored or further processed remotely. In some embodiments the one or more cameras observe the aquatic environment by being submerged in it. In other embodiments water from the aquatic environment is pumped through a device including the one or more cameras, for example in a transparent pipe.

In some embodiments the processing of image data from one or more images to identify key points utilizes a machine learning algorithm that has been trained on annotated image data of similar aquatic animals.

A method according to the invention may have only one camera and in these cases only one 2D skeleton is generated. The method may then further comprise defining for the nodes in the 2D skeleton and based on a known position of the one camera and the positions of the nodes in the 2D image plane, a direction in 3D space from the position of the camera to the image plane position of the respective 2D node, and estimating a 3D position for the nodes along the defined direction by matching possible position along the defined directions with possible poses for the aquatic animal. Possible poses are limited by the physiology or anatomy of the animal.

In embodiments with a plurality of cameras a plurality of 2D skeletons are generated, and the calculation of an estimated 3D position for nodes in a 2D skeleton comprises selecting one or more pairs of 2D images obtained from respective pairs of the plurality of cameras, and for which respective 2D skeletons have been generated, and for selected pairs of 2D images, calculating 3D positions for nodes in a 3D skeleton for corresponding pairs of nodes in the corresponding 2D skeletons based on epipolar geometry.

In some embodiments, based on the generated 2D skeleton, a fingerprint representation of an individual aquatic animal may be generated by delivering the generated 3D skeleton data structure as input to a fingerprint function, and storing or transmitting the generated fingerprint representation together with the 3D skeleton data structure.

In some embodiments an estimate of a 3D silhouette for the aquatic animal is generated from the 3D skeleton data structure, estimating biomass of the aquatic animal based on the generated 3D silhouette, and storing or transmitting a value representative of the estimated biomass.

In further embodiments a plurality of 3D skeleton data structures generated from a sequence of 2D images are obtained. Based on this sequence of 3D skeletons the change in pose for the aquatic animal over time can be analyzed in order to determine if any motion, pose, or behavior can be classified as abnormal. Upon detection of abnormal motion, pose, or behavior, a value representative of the classification as abnormal can be stored or transmitted.

A generated 3D skeleton may also be used to identify a region of interest on an aquatic animal, from this it is possible to identify a corresponding region in one of the 2D images of the aquatic animal, and then to search the corresponding region in the 2D image for presence of a feature in the image that is indicative of the presence of a corresponding object on the aquatic animal. Such an object may be selected from the group consisting of a deformity, a wound, an ulcer, an infection, a skin damage, a parasite, a sea louse, a plastic object, a fishing lines, and a tag.

According to another aspect of the invention a system is provided for generating a three-dimensional skeleton representation of an aquatic animal, comprising a device with two open ends connected by a channel, and configured receive water from an aquatic environment through the channel, one or more cameras attached to the walls of the device and directed towards the interior of the device, at least one processor configured to receive image data from the one or more cameras and to process the image data. The processing may include to identify key points on or inside the aquatic animal, including occluded key points, and their locations in the one or more 2D images, generate one or more 2D skeletons represented as nodes connected by edges, wherein each node in a 2D skeleton corresponds to one identified key point, calculate estimated 3D positions for nodes in the one or more 2D skeletons, determine the 3D coordinates of the nodes of a 3D skeleton from the estimated 3D positions of the nodes of the one or more 2D skeletons, and generate the 3D skeleton as a pre-defined structure of nodes connected by edges, and store or transmit the 3D skeleton as a data structure including the structure of nodes connected by edges. In some embodiments the device is configured to be submerged in the aquatic environment. In other embodiments the device is configured to be provided in the vicinity of the aquatic environment and to allow water from the aquatic environment to be pumped through the channel of the device.

A system according to the invention may be configured to use a machine learning algorithm that has been trained on annotated image data of similar aquatic animals to identify key points on the aquatic animal.

In some embodiments the system includes only one camera, and the processor is further configured to calculate estimated 3D positions relative to a known position of the camera by defining a direction in 3D space from the known position of the camera to a position of a key point identified in a 2D image plane, and calculate a corresponding 3D position by matching possible positions along the defined direction and possible poses for the aquatic animal.

In other embodiments the system includes a plurality of cameras, and the processor is configured to calculate estimated 3D positions relative to known positions of the plurality of cameras by detecting 2D positions of identified features in pairs of images obtained from pairs of cameras, and calculate corresponding 3D positions based on epipolar geometry.

Some embodiments of the invention include a plurality of light sources arranged to provide even illumination of objects inside the device.

In a system according to the invention the at least one processor may be further configured to generate a fingerprint representation of an individual aquatic animal by delivering the generated 3D skeleton data structure as input to a fingerprint function, and storing or transmitting the generated fingerprint representation together with the 3D skeleton data structure.

In further embodiments of a system according to the invention the at least one processor is configured to generate an estimate of a 3D silhouette for the aquatic animal from the 3D skeleton data structure, estimate biomass of the aquatic animal based on the generated 3D silhouette, and store or transmit a value representative of the estimated biomass.

The at least one processor may also be configured to obtain a plurality of 3D skeleton data structures generated from a sequence of 2D images, analyze the change in pose for the aquatic animal over time to determine if any motion, pose, or behavior can be classified as abnormal, and upon detection of abnormal motion, pose, or behavior, storing or transmitting a value representative of the classification as abnormal.

In some embodiments the processor is further configured to identify a region of interest on an aquatic animal from the generated 3D skeleton data structure, identify a corresponding region in one of the 2D images of the aquatic animal, and search the corresponding region in the 2D image for presence of a feature that is indicative of the presence of a corresponding object on the aquatic animal. The corresponding object may be selected from the group consisting of a deformity, a wound, an ulcer, an infection, a skin damage, a parasite, a sea lice, a plastic object, a fishing lines, and a tag.

The one or more processors may be at least two processors located at or configured to be located at at least two different locations, the at least two different locations being selected from the group consisting of: in or attached to the device, in a computing device in the vicinity of the aquatic environment, in a remote computer.

According to yet another aspect of the invention a non-transitory computer-readable medium is provided. This medium may store instructions enabling one or more processors to perform one of the methods of the invention.

BRIEF DESCRIPTION OF THE DRAWINGS

In order to provide a better understanding of the invention and its various aspects, features, and advantages, invention will now be described by way of examples and with reference to the attached drawings, in which.

DETAILED DESCRIPTION

Figure 1:
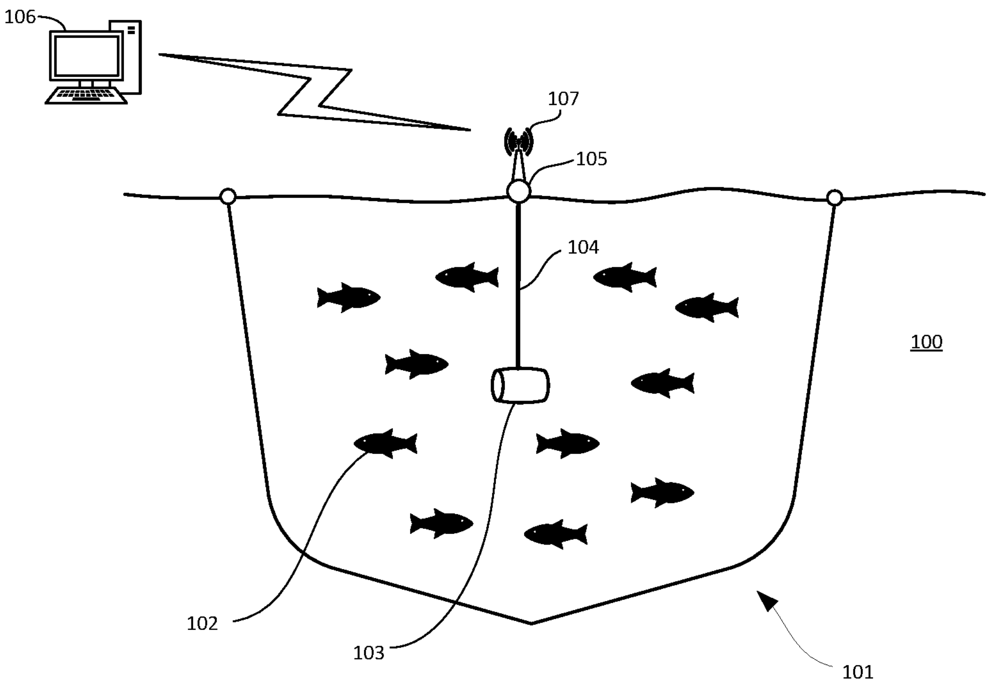
FIG. 1 is an overview of a system according to an embodiment of the invention.

The following description of embodiments will give a better understanding of the principles of the invention. In the description, reference will be made to the drawings, in which like reference numerals denote the same or corresponding elements. The drawings are not necessarily to scale. Instead, certain features may be shown exaggerated in scale or in a somewhat simplified or schematic manner, wherein certain conventional elements may have been left out in the interest of exemplifying the principles of the invention rather than cluttering the drawings with details that do not contribute to the understanding of these principles.

It should be noted that, unless otherwise stated, different features or elements described below may be combined with each other whether or not they have been described together as part of the same embodiment. The combination of features or elements in the exemplary embodiments are done in order to facilitate understanding of the invention rather than limit its scope to a limited set of embodiments, and to the extent that alternative elements with substantially the same functionality are shown in respective embodiments, they are intended to be interchangeable. For the sake of brevity, no attempt has been made to disclose a complete description of all possible permutations of features.

Furthermore, those with skill in the art will understand that the invention may be practiced without many of the details included in this detailed description. Conversely, some well-known structures or functions may not be shown or described in detail, in order to avoid unnecessarily obscuring the relevant description of the various implementations. The terminology used in the description presented below is intended to be interpreted in its broadest reasonable manner, even though it is being used in conjunction with a detailed description of certain specific implementations of the invention.

Reference is first made to FIG. 1 which shows an aquatic environment 100 and a fish cage 101 with a number of fish 102 swimming freely inside the cage 101. A device 103 holding one or more cameras is submerged into the fish cage 101. This device 103 will be described in further detail below. The invention is not limited to observation or monitoring of fish, and more generally the observed objects may be referred to as aquatic animals 102.

The device 103 is hanging from one or more ropes, cables, or wires 104. In the illustrated embodiment one cable is shown and it is attached to a buoy 105 floating on the surface, but other means of attaching the device or otherwise controlling its position in the aquatic environment 100 are possible. Various mechanisms not shown in the drawing may be present in order to secure the position of the buoy 105 or allow adjustment of this position, and also to adjust the depth at which the device 103 is positioned. In other embodiments the device 103 may be provided in the aquatic environment 100 through other means. For example, the device 103 may be attached to the wall of a tank or pool, or it may be part of a remotely operated vehicle (ROV) or autonomous underwater vehicle (AUV).

The cable 104 may include a signal cable (see FIG. 2) in the form of an electrical transmission cable, an optical fiber, or some other means of transporting data carrying signals from the device 103 to the buoy 105. The buoy 105 may in turn be connected to a computer system 106 over a communication link. In the drawing this communication link is represented by a wireless transmitter 107 provided on the buoy 105. However, other forms of communication, for example wired connections, are also possible. The computer system 106 may be provided in close vicinity to the fish cage 101, or remotely. The computer system 106 may also be a combination of functionality distributed over more than one computing devices at multiple locations, including locally in the device 103. The computer system 106 as shown in the drawing should therefore be understood as a representation of the computing capabilities of the system as a whole, and not necessarily as an individual computer at a specific location. The communication link between the buoy 105 and the computer system 106 may thus be a combination of several links using different forms of communication, including for example the Internet, a cellular network, etc.

Figure 2:
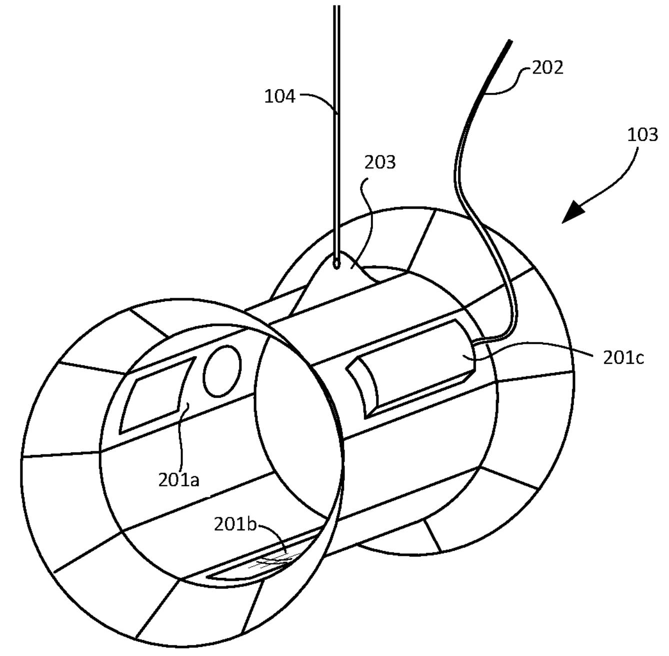
FIG. 2 is a perspective view of a device provided with cameras for observation of aquatic animals.

The device 103 is shown in further detail in a perspective view in FIG. 2. The device 103 includes cameras and light sources. The device may also include some data processing capabilities. How much is a matter of implementation detail, but it may range from simple pre-processing and transmitting capabilities to substantial processing of video images from the cameras in the form of computers installed in the device 103 and performing edge computing with respect to the system as a whole. In the illustrated embodiment camera and light sources are provided in a plurality of camera housing assemblies 201. In the drawing a first camera housing assembly 201*a* can be seen from the inside of the device 103 is shown without any glass front in order to give a view of the camera lens and light source that will be shown in further detail in FIG. 3. A second camera housing assembly 201*b* can be seen with the front glass in place. The glass is there in order to provide protection against the surrounding water while allowing illumination and a free view of the inside of the device 103. Other configurations are possible. Light source and camera need, for example, not share a common glass front. A third camera housing assembly 201*c* is seen from the outside of the device 103. A power and signal cable 202 is shown connected to camera housing assembly 201*c*. Corresponding cables (not shown) are connected to all of the camera housing assemblies 201, and they may be routed to the surface as separate cables. Alternatively, the camera housing assemblies 201*a-c* may be interconnected and connected to the surface using only one cable. The cable 202 provides power to the electronic components inside the camera housing assemblies and enables transmission of signals between these components and equipment on the surface. The power and signal cable 202 may be part of or separate from the cable 104 from which the device 103 is suspended.

The device 103 is open such that a channel is provided through the device from one end to the other. The camera housing assemblies 201 are provided such that the cameras are directed towards the center axis of the channel and the light sources illuminate the area covered by the cameras. The openings at each end of the device 103 may be wider than the rest of the channel, resulting in a funnel shaped channel through the device. In this way, fish or other aquatic animals present in the water will more easily enter into the channel at one end, and then have to pass relatively close to the camera housing assemblies 201.

Figure 3:
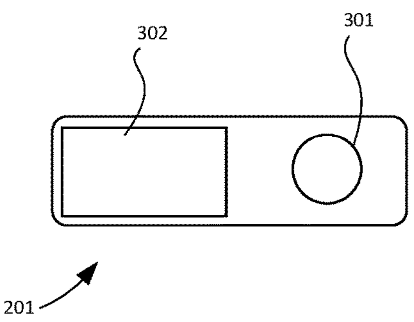
FIG. 3 shows an embodiment of a camera housing assembly from the front.

FIG. 3 shows an embodiment of a camera housing assembly seen from the front and with the glass front removed, corresponding to 201*a* in FIG. 2. This view shows a camera 301 with a light source 302 mounted to one side of the camera 301. The light source may in principle by any type of light source known in the art and with characteristics suitable for this type of underwater application, and there may be multiple light sources 302 provided, for example, on both sides of the camera 301, in a circle around the camera lens, or in any other suitable manner. The present disclosure will therefore refer to these as light sources 302 without attempting to specify further characteristics, which may be left to the designer of a particular embodiment.

The camera housing assemblies 201 may include additional components such as electronic circuitry, for example in the form of one or more general purpose computers, field programmable gate arrays (FPGA), application specific integrated circuits (ASIC), and/or other types of components, and they may be implementing anything from limited control of the cameras 301 and light sources 302, to more advanced signal and graphics processing, or even substantial edge computing implementation of advanced image processing and machine learning algorithms. As such, the invention may be implemented as different embodiments where functionality is distributed or centralized in various degrees.

While the light sources 302 in this embodiment are shown as integrated parts of the camera housing assemblies 201, such that they illuminate objects inside the device 103 from substantially the same direction as the one from which the objects are viewed by the corresponding camera, the light sources 302 may, in other embodiments, be arranged to illuminate the objects from different angles. As an example, the light sources 302 may be provided midway between two cameras such that an equal amount of light from two adjacent light sources illuminate an object as seen from the viewing angle of a particular camera 301.

The cameras 301 must be able to produce images with sufficient detail and sharpness to facilitate the processing that will be described in further detail below. Requirements that may have to be taken into consideration include resolution, light sensitivity, contrast, and depth of field. In an exemplary embodiment three 9MP cameras with 1-inch sensor size, 6 mm lens, and 12 frames per second acquisition rate may be used, as these parameters may be able to handle low light conditions and close proximity to the objects. As will be described above, the number of cameras does not have to be three.

The necessary intensity, or luminosity, of the light sources 302 will depend on circumstances such as the overall dimensions of the device 103 and the distance from the light sources 302 to the objects that are illuminated, such as fish 102, and the distance from object to camera 301. Other factors amount of ambient light, which in turn may depend on time of day, weather, geographic location, and depth, as well as water clarity, which may be influenced by suspended particles in the water and dissolved solids such as colored dissolved organic material (CDOM). Consequently, the amount of light required from the light sources 302 must be left to the designer of a particular embodiment based on circumstances associated with intended use, or range of intended uses. In a design with cameras with the specifications given above, three light sources with a theoretical luminosity of about 13.400 lumens, for a total of approximately 40.000 lumens, may be adequate.

In some embodiments the light sources 302 may be configured to emit light other than white. In particular, the light sources may emit light with wavelengths that are chosen based on color or photoluminescence of objects or features that will be observed using the invention, including wavelengths outside the visible spectrum, such as ultraviolet (UV). While the invention is designed to facilitate monitoring of aquatic animals, the animals alone are not necessarily the only objects that are observed. It may, for example, be desirable to identify specific features of the animals, or additional objects attached to or near the animals, such as sea louse or other parasites, plastic objects, tags, and more. Since the invention is not limited to any specific type of object to be observed, selection of colored light sources 302 may depend on specific circumstances including the types of objects to be observed as well as characteristics of particles suspended in or dissolved in the water.

Figure 4:
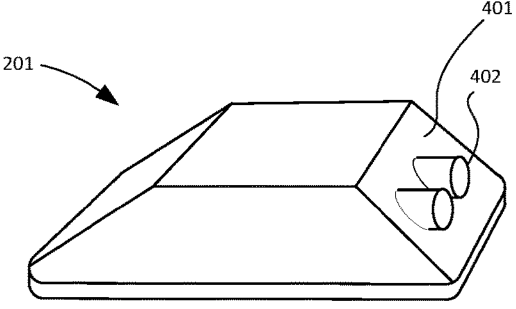
FIG. 4 shows and embodiment of a camera housing assembly from the back.

FIG. 4 shows a perspective view of a camera housing assembly 201 from the back. The camera housing 401 itself is watertight and may be made from metal or from some other suitable material for example plastic or fiberglass. Connectors 402 are arranged such that signal and/or power cables 202 may be connected to the components on the inside of the camera housing assembly 201.

Returning to FIG. 2, the device 103 in the illustrated embodiment further includes a lifting beam 203 to which the cable 104 is attached. Multiple cables may be used in some embodiments where each cable may be stretching in different directions for increased stability. In this embodiment the signal cable 202 is a separate cable, but it may be attached to or integrated in a carrying cable 104.

The dimensions of the device 103, both with respect to its overall size and with respect to its various components, depend primarily on the size of the aquatic animals it is intended to view. In addition, embodiments intended for rough open sea applications or in streams or rivers with strong and variable currents may require more sturdy construction. The mechanical specifics of the device 103 are, however, not part of the invention as such and can be determined by the designer of a specific embodiment based on local requirements.

Figure 5:
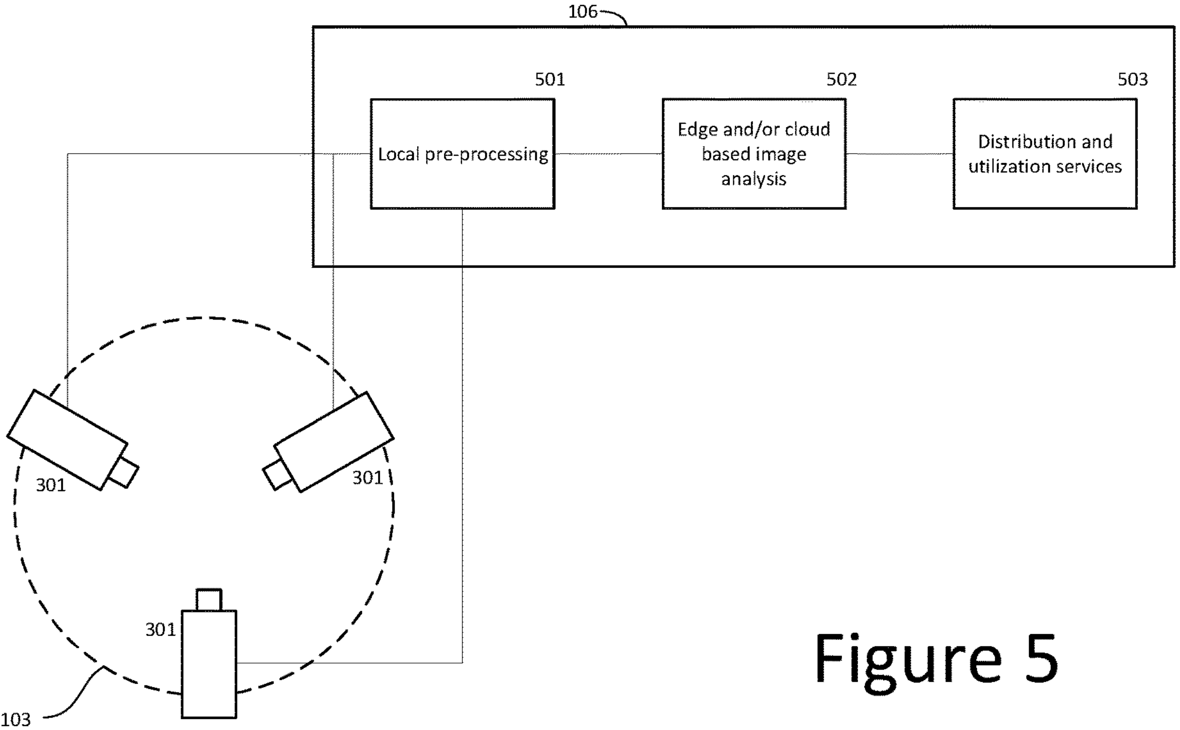
FIG. 5 is a conceptual illustration of modules in an embodiment of the invention.

FIG. 5 is a conceptual illustration of modules in an embodiment of the invention. In this illustration emphasis is not on physical properties but on information processing. The drawing shows three cameras 301 directed towards the center of a device 103. The cameras are connected to a local pre-processing module 501. In some embodiments there may be one such module for each camera 301, while in other embodiments there may be a common local module which is configured to process images from all cameras 301. The amount of processing delegated to the local pre-processing module 301 may vary. In some embodiments pre-processing may be limited to simply receiving images from the cameras and preparing them for transfer to a downstream module. In other embodiments the pre-processing module may perform a substantial pre-processing steps, which may include noise reduction, image compression, background isolation (e.g. by changing the background to a uniform color), and even 2D key point identification and 2D skeleton generation, as will be described in further detail below.

The module downstream from the pre-processing module 501 is an image analysis module 502. This module may be implemented as one or more edge computing modules, or as a cloud service, or as a combination of edge and cloud computing where some tasks are performed near the cameras and additional processing is performed in the cloud. In embodiments where the image analysis module 502 is implemented as edge computing modules, such modules may be integrated in the device 103, for example inside one or more camera housing assemblies 201. In embodiments where the image analysis is implemented as a cloud service, one or more server computers remotely located from the fish cage 101 receives pre-processed images from the pre-processing modules 501, for example using communications capabilities as illustrated in FIG. 1.

The results of the image analysis will be described in further detail below, where it will also be explained that the amount and the range of results provided by the image analysis module 502 may vary in different embodiments. The results may then be forwarded or made available to distribution and utilization services 502 that may, for example, be implemented as cloud based services from which the results from the image analysis may be accessed by users to be utilized directly or to be used as input to further analysis, statistics or monitoring.

It will be realized that the actual location of the steps illustrated in FIG. 5, both geographically, across devices and systems, and with respect to the individual or organization that initiates the processing and utilizes the results, may vary in different embodiments. As such, a wide range of configurations are possible with respect to how much pre-processing to perform, where to perform this pre-processing, whether to distribute sophisticated image processing (e.g. machine learning and artificial intelligence) to the edge of the system or to centralize these capabilities as one or more cloud based services, and so on. Collectively, the processing modules 501, 502, 503 may be thought of as one computer system 601 consisting of several modules that may be implemented as a combination of software and hardware and located at one or several locations, including in the device 103, in the vicinity of the body of water 100 in which the device is submerged, and remotely for example in a remote control room, a server, or as a cloud service.

Figure 6:
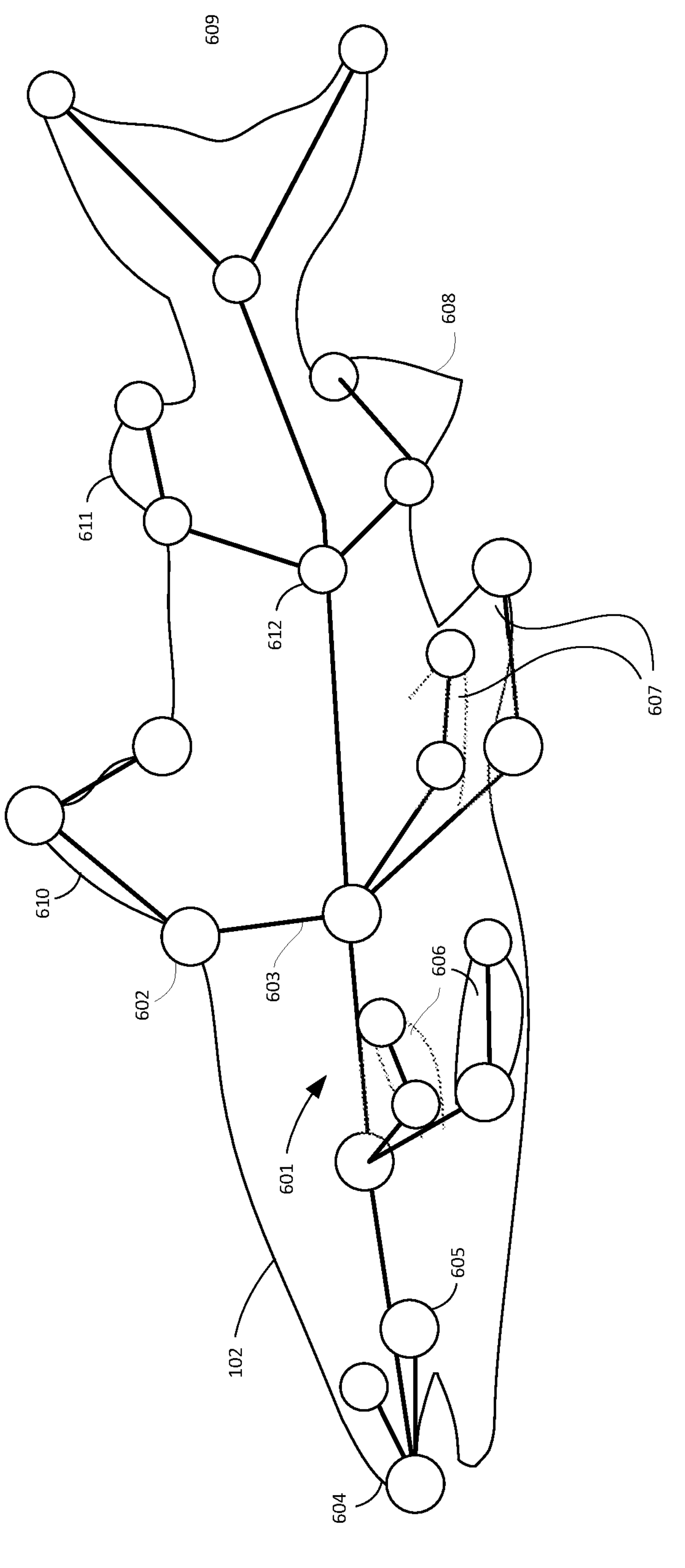
FIG. 6 shows a perspective view of an aquatic animal 102 and a corresponding 3D skeleton representation.

Reference is now made to FIG. 6, which illustrates an aquatic animal, in this case a fish, and a 3D skeleton which is generated from key points on or inside the fish. With an arrangement of cameras viewing the interior of the device 103 from a plurality of angles, it is possible to obtain images of the observed aquatic animal that essentially cover its entire circumference. 3D information about the aquatic animal may then be derived based on a comparison of how various details or features of the animal are positioned relative to each other in images captured from different angles or points of view. These relationships make it possible to go from 2D skeletons generated from individual 2D images to 3D skeletons like the one illustrated in the drawing. The generated 3D skeleton can be used to measure dimensions, pose, movement and more.

For types of aquatic animal that by their nature exhibit individual variations in the relationships between different dimensions in the 3D skeleton, animals may be individually identified each time they are captured by the cameras. This may, for example, be the case for fish.

Gradual changes in the relative position of features with respect to each other, or changes in ratios of the 3D skeleton, may be used to track changes in the aquatic animal, for example growth, and this may be used to estimate increase in biomass. Previously, it has been proposed to examine areas near landmark points on an image of a fish and use feature extraction to build feature vectors that hopefully can be used to identify individual fish. One example of such a technique is described in PCT patent application publication WO 2020/023467, the contents of which is hereby incorporated by reference in its entirety.

The 3D skeleton approach provided by the present invention is different and relies in part on knowledge from 2D and 3D pose estimation. Pose estimation is a method for describing or predicting the transformation of an object from a defined reference pose, and the technique has been used for example in surveillance, motion capture for entertainment, and in sports motion analysis. 3D pose estimation has also been used to analyze the motion of animals.

In the context of the present invention, the term skeleton should not be interpreted literally as referring to the actual skeleton of a fish or some other animal that is being observed. Instead, the generated skeleton represents nodes that bear a defined relationship with certain key points on the animal and these nodes are connected by generating a link, or edge, between them. Thus, the 3D skeleton can be described as a graph of nodes (vertices) connected by edges (links), or as node objects that point to each other in a pre-defined manner. In other words, the 3D skeleton will be set of nodes connected by edges and with a pre-defined structure. The key point nodes may correspond to a joint in the actual skeleton of the object, but this does not have to be the case. Similarly, the connection between two key point nodes may correspond to an actual bone in the body of the animal but again this does not have to be the case. Instead, the generated skeleton represents key points or features and the relationship between them. Key points that are connected will typically remain at a fixed distance from each other, except as a result of natural growth, while deformation will result in changes in the distances between nodes that are not directly connected by an edge. Some exceptions may occur, as will be seen below.

FIG. 6 shows an example of such a 3D skeleton representation 601. This skeleton 601 is representative of a fish 102, such as a salmon, and may have been generated from 2D images of the fish, as will be described below. The skeleton 601 includes nodes 602 and edges 603. Only one node and one edge are given reference numbers in the drawing in order to avoid unnecessary cluttering of the drawing. It will be understood that FIG. 6 by necessity is a 2D perspective presentation of the 3D skeleton. The drawing may therefore represent the generated 3D skeleton model as such, as well as 2D representations on computer screens of a 2D image with key points added by a human user during training (annotated images) and 2D representations on computer screens of key points generated by a computer system based on key point identification and generation of a 2D skeleton, as will be described in further detail below.

Nodes 602 are associated with key points that are found at various locations on the fish 102 Such key points may include the snout 604, the eyes 605, the respective ends of the pectoral fins 606, the pelvic fins 607, and the anal fins 608, and at the root and upper and lower end of the caudal fin 609. Nodes 602 may also be located at the dorsal fin 610 and adipose fin 611. It should be noted that in this example there are three nodes associated with the dorsal fin 610 and that the distance between two of them are not fixed despite the fact that they are represented as being connected by an edge. These two will be brought closer together when the dorsal fin is flattened along the back of the fish, which means that the length of this edge will vary depending on the pose of the fish. This may have to be taken into consideration when generating the 3D skeleton described below. It should also be noted that some nodes, exemplified by node 612, are inside the fish 102. Identification of nodes may be based on a machine learning algorithm and such an algorithm may be trained to determine the location of nodes that are inside an aquatic animal, as will be described in further detail below.

It should be realized that the skeleton shown in FIG. 6 is an example, and that other key points as well as a different selection of edges connecting them, could be chosen. Furthermore, for different types of fish different key points may be more convenient, or even necessary. For example, not all types of fish have an adipose fin, and some fish have several dorsal fins. Other features may also be selected, based, for example, on the location of gills, lateral line, coloring, etc. If the animal is something other than a fish, for example a shrimp, an octopus, a jellyfish, or an aquatic mammal, the selection of key points will, of course, be entirely different from this example.

When images of an animal, such as the fish in FIG. 6, is captured by the cameras 301, the result will be a plurality of 2D images from the point of view of each of the respective cameras 301. When the 2D images are analyzed and the location of key points in the 2D images are determined, each image will provide 2D coordinates of a location in the image plane and a direction based on the 2D coordinates and the location of the camera that captured the image. By combining two or more images it is possible to derive 3D coordinates for each key point that is visible in at least two images. If the animal is too long to be captured in its entirety by the camera setup, it may be possible to generate the entire 3D skeleton based on composite images generated by images with overlapping regions.

Figure 7:
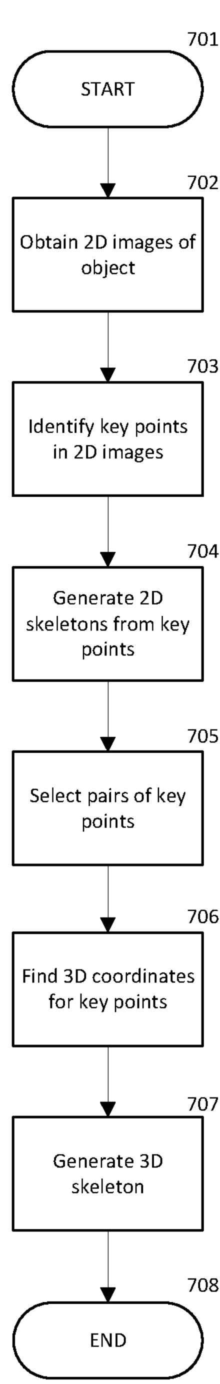
FIG. 7 is a flow diagram for an embodiment of a method of generating a 3D skeleton representation.

The process of capturing images and generating the 3D skeleton will now be described in further detail with reference to a flow chart shown in FIG. 7. The process starts in an initiating step 701. In a following step 702, 2D images are obtained from the respective cameras 301. These images are subject to pre-processing 501, as described with reference to FIG. 5, to prepare them for transfer and/or for local image analysis. Subsequent to pre-processing, the 2D images are analyzed in step 703 where key points are identified in the respective 2D images.

Identification of key points is performed by processing the 2D images and identifying features that are representative of key points or otherwise indicative of the location of key points. A number of different feature extraction methods are known in the art and may be selected for embodiments of the invention. Machine learning algorithms are particularly suited for this task, and again there are several approaches or classes of algorithms to choose from. A suitable alternative is a deep neural network (DNN) in particular one involving a convolutional neural network (CNN). The neural network may be trained using annotated images obtained from the same or a similar setup of submerged cameras and annotated by humans qualified to identify key points in images of the relevant type of aquatic animal. This means that many images, for example a few thousand, of the same type of animal are displayed e.g. on the screen of a workstation and a human operator provides user input for example by using a mouse to click on relevant positions in the images and adding relevant text or other information by typing or selecting from a drop down menu. The human operator can click on positions he or she estimates to be the appropriate location in an image even for occluded key points (e.g. fins on the far side of a fish relative to the camera) and key points inside the animal (e.g. points along the spine of the fish). The annotated images may then be delivered as input to the neural network. The neural network is trained based on this input. Subsequent to training, the neural network is able to identify key points in images it has not been presented with during training, including occluded key points and key points that are inside the animal. From the above it will be understood that key points are not the same as visible features on the surface of the aquatic animal. Some key points may be associated with one or several such features, but key points may equally well be determined from other characteristics, and represent features or positions on or inside the aquatic animal that are occluded or inside the animal.

After all key points that can be identified in a particular set of images from the respective cameras 301 have been identified, they are associated with nodes connected by edges in a pre-defined structure. The result is a set of 2D skeletons where each node is associated with coordinates in a 2D image plane. In some embodiments of the invention only one camera 301 is used. The result of the identification will then be a 2D skeleton in a perspective view in the image plane. Since an aquatic animal is limited by its physiology and anatomy with respect to possible poses, the 2D skeleton can be matched with possible poses in a process similar to what is known for human pose estimation as described, for example, in 3D Human Pose Estimation=2D Pose Estimation+Matching by Ching-Hang Chen and Deva Ramanan as a conference paper at the 2017 IEEE Conference on Computer Vision and Pattern Recognition. That paper is available from IEEE Xplore and it is hereby incorporated by reference in its entirety. Using pose estimation represents going directly to step 706 to find 3D coordinates, or positions, for key points associated with nodes in the one 2D skeleton available. With more than one camera, 3D positions for each key point can be found using epipolar geometry, which will be described in further detail below. In this case the process proceeds from step 704 to step 705 where pairs of key points are selected. In step 706, 3D positions for corresponding key points viewed from different cameras are estimated. This means that the generated 2D skeletons now have 3D positions associated with their nodes. These 3D positions can be used to determine 3D coordinates for nodes in a 3D skeleton, for example by averaging the positions of corresponding nodes in the 2D skeletons. It should be noted that the one or more 2D skeletons may be temporary results that are not delivered as output from the described process and the corresponding system. As such, the 2D skeletons do not have to exist as explicitly defined data structures, but only held temporary in memory, for example by being associated with the final 3D skeleton.

In step 707, after the 3D coordinates have been determined for each node in the 3D skeleton, the 3D skeleton as a whole can be generated and provided as output from the process. The skeleton will now comprise a complete set of pre-defined nodes and links, or edges, between them according to the defined structure of the 3D skeleton. The process of generating the 3D skeleton can now be terminated in step 708.

It should be noted that while the method described above is based on the use of three cameras, alternative embodiments may use a different number of cameras. For embodiments with more than three cameras, there are additional opportunities to generate pairs of key-points and the method otherwise remains the same. With only two cameras, it is likely that key-points will be occluded from the perspective of at least one of the cameras, and the precision of the generated 3D coordinates may become lower.

When a 3D skeleton for an observed aquatic animal has been generated, a fingerprint for that skeleton can be generated. In this context, a fingerprint may be an array, or vector, of characteristic relationships for the 3D skeleton for that particular observed object. The fingerprint may, for example, be the length of each edge in the skeleton graph, normalized by setting the length of a predefined one of the edges to unity, i.e. $l=1$, and giving all other lengths relative to this unit length. For particularly large skeletons only a subset of relationships may be used. In computing a fingerprint algorithm, or fingerprint function, maps a large amount of date on a shorter string that for all practical purposes uniquely identifies the large amount of data. For the purposes of the present invention it may be acceptable that there is a certain risk that two different individuals will end up with the same fingerprint. Conversely, it may be desirable to calculate the same fingerprint from 3D skeletons that are not identical even though they have been generated from the same individual animal. A positive identification may therefore be based on a metric that will measure similarity between two 3D skeletons according to some metric.

The viability of this method depends on individual variation between the type of aquatic animal being observed. The extent to which various animals retain fixed rations between the various dimensions of the parts of their physiology may vary between different types of animals. This method for identifying individuals may therefore be useful over relatively short periods of time, while in the long run it may be necessary to combine this method with other methods, for example spot pattern recognition or facial recognition. For salmon it has been found that facial recognition as well as spot pattern recognition can give a high rate of recognition of individuals (perhaps in the range of 85% to 95%) from images taken several months apart. The method of the present invention, described below, may therefore be combined with such methods in order to improve recognition rates, or by making them more efficient by providing a method of removing options.

Figure 8:
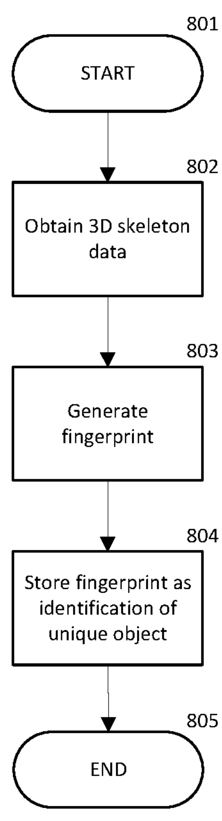
FIG. 8 is a flow diagram for an embodiment of a process for identifying individual aquatic animals based on 3D skeleton representations.

FIG. 8 shows in a flow chart an embodiment of a process for identifying individual aquatic animals. The process starts in step 801 and progresses to step 802 where 3D skeleton data are obtained, for example by way of the method described with reference to FIG. 7.

In step 803 a fingerprint is generated based on the relative lengths of the edges in the 3D skeleton graph. In step 804 this fingerprint is stored in a database or table, for example as a vector which may be referred to as an identity vector. The method then terminates in step 805.

Figure 9:
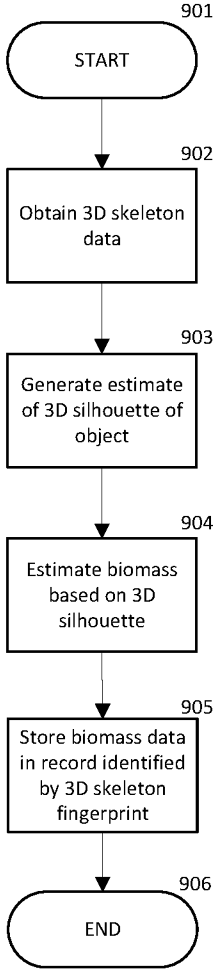
FIG. 9 is a flow diagram for an embodiment of a process for estimating biomass of aquatic animals based on 3D skeleton representations.

In accordance with the invention the 3D skeleton generated in the process described with reference to FIG. 7 may also be used to estimate biomass. An exemplary embodiment of such a process is described with reference to FIG. 9.

The process is initiated in step 901 and proceeds to step 902 where 3D skeleton data are obtained, for example by running the process described above or by accessing previously generated skeleton data stored in a database. Based on the 3D skeleton an estimate of a 3D silhouette may be generated. This silhouette may be generated 903 based on the skeleton alone, but it is also possible to supplement the 3D skeleton data with other image data. The silhouette does not necessarily have to be explicitly represented in the system. It may also be represented as mathematical expressions of geometrical shapes that are parametrized based on a selection of nodes 602. The 3D silhouette of a fish 102 may for example be represented as a cone with its apex at the snout 604 and its base at the eyes 605. A conical frustum (a cone with its top cut off) with its may be used to represent the volume from the eyes to the pectoral fins 606. A cylinder may be used to represent the volume from the pectoral fins 606 to the pelvic fin 610, and perhaps another conical frustum or cone from the pelvic fin 610 to the caudal fin 609. Other combinations of geometric shapes are, of course, possible, and may be desirable or even necessary.

Another possibility is to use the points of the 3D skeleton and generate the 3D silhouette by connecting all nodes that are on the surface of the animal with surface splines.

When the 3D silhouette estimate has been generated, a corresponding estimate of its volume can be calculated, and its mass can be estimated in step 904 based on the average density for the type of animal being monitored.

In step 905 the estimated biomass may be stored together with the record generated in the process described with reference to FIG. 7 and/or other methods for recognition of individual animals. This information may now be used to track the growth of individual aquatic animals, as well as the total and average biomass for all animals in a cage 101.

The process ends in step 906.

Figure 10:
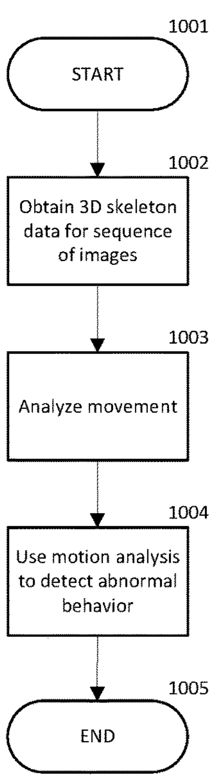
FIG. 10 is a flow diagram for an embodiment of a process for analyzing movement and detecting abnormal behavior.

According to yet another aspect of the invention the 3D skeleton data may be used as illustrated in FIG. 10 to detect abnormal behavior. Following an initiating step 1001 the process moves to step 1002 where 3D skeleton data is obtained from a sequence of images, for example frames in a video sequence. In step 1003 the relative positions and movement of nodes over the sequence of images analyzed and in step 1004 it is determined whether the analysis has detected movement that is abnormal for the type of aquatic animal, for example movement that is indicative of sickness in a fish. If abnormal behavior is detected, this may be registered, counted, an alarm may be triggered, or some other action may be initiated. In the context of the present invention, abnormal behavior may be any motion, pose, or behavior that can be detected as a pattern in the images and that may be indicative of a specific condition that can be associated with the aquatic animal. The process then terminates in step 1005.

Figure 11:
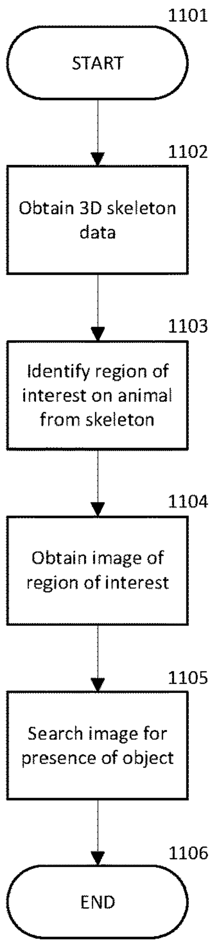
FIG. 11 is a flow diagram for an embodiment of a process for searching for the presence of specific objects on an aquatic animal.

Yet another aspect of the invention is illustrated in FIG. 11, which is a flowchart of a method for identifying specific features, conditions, or objects on or attached to the aquatic animal. Such a feature may, for example, be deformities, wounds such as winter sores or winter ulcers, infections, skin damage caused by handling, etc. and objects may be parasites like sea lice, plastic or fishing lines entangling a sea mammal or sea turtle, and the like. Many such features or objects are typically located at specific parts of animals and using image processing to search for them may be more efficient if concentrated on these parts. Examples include near gills or fins, near the anal opening, and around the neck. Which areas to prioritize depend both on the type of aquatic animal being monitored and the type of feature or object being searched for. For simplicity reasons features, conditions, and objects will all be referred to as objects in this disclosure and in the claims. This does not imply that the invention can only be used to identify objects that are separate from the aquatic animal. Instead, the word object will also refer to wounds, sores, deformities and other properties or conditions that may be part of the animal. The word feature will be used to refer to specific properties of the image data, such as a given color, pattern, edge, or shape, or combination of two or more of these.

The process is initiated in step 1101 and progresses to step 1102 where 3D skeleton data is obtained, either by using the method described above, or by accessing previously generated skeleton data. In a next step 1103 a region of interest is identified based on the skeleton data. This region of interest may be a part of the animal that is particularly susceptible to a given condition, for example a wound, a deformity, attack by parasites, entanglement or attachment by manmade objects, whether this is accidental (e.g. plastic trash) or deliberate (e.g. a tag). The area of interest may also be one where identifying features can be expected to be found, for example facial features or spot patterns. This process may therefore be combined with methods for recognition of individual animals as described above.

The process then progresses to step 1104 where an image of the region of interest is obtained. This image may be generated from image data received from one or more of the cameras 301 subsequent to the identification of the region of interest. Alternatively, the skeleton data may be used to identify a region of interest of an image already captured, for example an image used to generate the skeleton data.

In step 1105 the image of the region of interest is processed in order to determine whether the image includes any feature indicative of the presence of the object searched for. The search algorithm used may be based on machine learning in a manner similar to the method used to search for key-points as described above. However, it is also possible to use feature extraction and/or pattern recognition based on known properties of the object searched for.

Upon detection of a searched for object, this may be registered, counted, an alarm may be triggered, or some other action may be initiated. The described process may be repeated continuously, or halted in step 1106.

As described above, different embodiments of the invention may have computational resources distributed in different ways, including edge computing in the submerged device 103, local computational resources in the vicinity of an installation, or remote processing in the cloud or in a server farm. As such, the processes described with reference to FIG. 7 through FIG. 10 may be performed in any one of these locations or distributed among several locations.

Figure 12:
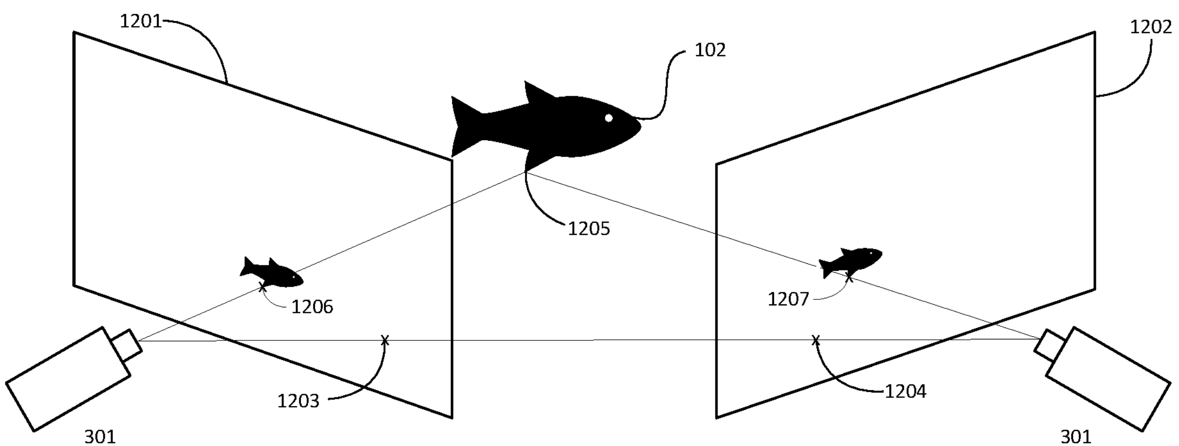
FIG. 12 is a diagram illustrating the use of epipolar geometry to determine 3D coordinates for key points identified in 2D images.

Epipolar geometry will now be described with reference to FIG. 12. The figure shows a simplified representation of two cameras 301 viewing an aquatic animal 102, in this case a fish, from two different positions. The two cameras 301 capture images in respective image planes 1201, 1202. The image planes 1201, 1202 are here represented in front of the cameras 301, but the actual image plane will, of course, be on the video sensors behind the lenses of the cameras 301.

The cameras 301 are arranged such that they can view each other, such that each camera has a position 1203, 1204 in the image plane of the other camera. Furthermore, the aquatic animal 102 will be represented in both image planes 1201, 1202, and by means of the present invention the location of a key point 1205 will be located at respective positions 1206, 1207 in the two image planes 1201, 1202. Since the positions of the two cameras 301 are known, the position of the key point 1205 on the aquatic animal 102 can now be found using triangulation. The description given above is not the only possibility. For example, the cameras 301 do not have to view each other directly. Instead, their location in each other's image planes may be known, their position and direction relative to objects in their common field of view may be known, or other data that enables multi-view geometry calculations may be available.

The instructions enabling one or more processors in the processing modules 501, 502, 503 to perform the methods described herein may be stored on a non-transitory computer readable medium. Such a storage medium may, for example, be an electrically erasable programmable read only memory (EEPROM), a flash memory, an optical disc, a hard drive, or another type of storage medium known in the art. During execution, the instructions along with any data operated on or resulting from the operations, may be temporarily stored in working memory which may be some type of random access memory (RAM) as is well known in the art.

The invention has been described with reference to an exemplary embodiment where a device 103 is submerged in an aquatic environment. In other embodiments the device 103 may instead be provided above water, for example on board a vessel or on shore. The aquatic environment may then be observed by the cameras 301 by allowing water from the aquatic environment to stream through the device 103, for example by being pumped through the channel between the two open ends of the device. This may be done by leading a transparent pipe through the device 103. Alternatively, the device 103 may be configured as a pipe section with windows for the cameras 301 and lights, and where pipes may be connected to the two openings at either end of the channel.

This on board or on shore configuration may be temporary or permanent. In some embodiments a device designed to be submerged in water may also be adapted to use out of water. In other embodiments, some of the details relating to waterproofing the device 103 may be omitted from devices intended only for on board or on shore use. It will be understood that otherwise, with respect to image processing and construction of skeleton models, the on board and on shore embodiments of the invention are the same as submerged embodiments.

The invention claimed is:

1. A method in a computer system for generating a three-dimensional skeleton representation of an aquatic animal among a population of aquatic animals in an aquatic environment, comprising:

obtaining one or more 2D images of the aquatic animal from one or more cameras configured to observe the aquatic environment;

processing image data from one or more of the obtained 2D images to identify key points on or inside the aquatic animal, including occluded key points, and determine their locations in the one or more 2D images;

generating one or more 2D skeleton graphs represented as nodes connected by edges, wherein each node in a 2D skeleton corresponds to one identified key point;

calculating an estimated 3D position for nodes in the one or more 2D skeleton graphs;

from the estimated 3D positions of the nodes of the one or more 2D skeleton graphs, determining the 3D coordinates of the nodes of a 3D skeleton and generating a corresponding 3D skeleton graph as a pre-defined structure of nodes with 3D coordinate positions, connected by edges representing straight line distances between respective pairs of nodes;

storing the 3D skeleton graph in a database as a representation of the aquatic animal or transmitting the 3D skeleton graph as a data structure including the structure of nodes connected by edges;

estimating the biomass of the aquatic animal by performing mathematical operations on one or more of the nodes and one or more of the straight line distances in the stored or transmitted 3D skeleton graph; and tracking growth in the population based on biomasses estimated from respective 3D skeleton graphs generated at different times.

2. The method according to claim 1, wherein the one or more cameras observe the aquatic environment by being submerged in it.

3. The method according to claim 1, wherein the processing of image data from one or more images to identify key points utilizes a machine learning algorithm that has been trained on annotated image data of similar aquatic animals.

4. The method of claim 1, wherein the one or more cameras is one camera and the generating one or more 2D skeletons generates one 2D skeleton, the method further comprising:

defining for the nodes in the 2D skeleton graph and based on a known position of the one camera and the positions of the nodes in the 2D image plane, a direction in 3D space from the position of the camera to the image plane position of the respective 2D node;

estimating a 3D position for the nodes along the defined direction by matching possible position along the defined directions with possible poses for the aquatic animal.

5. The method of claim 1, wherein the one or more cameras are a plurality of cameras and the generating one or more 2D skeleton graphs generates a plurality of 2D skeleton graphs, wherein calculating an estimated 3D position for nodes in a 2D skeleton graph comprises:

selecting one or more pairs of 2D images obtained from respective pairs of the plurality of cameras, and for which respective 2D skeleton graphs have been generated; and for selected pairs of 2D images, calculating 3D positions for nodes in a 3D skeleton for corresponding pairs of nodes in the corresponding 2D skeleton graphs based on epipolar geometry.

6. The method of claim 1, further comprising:

generating a fingerprint representation of an individual aquatic animal by delivering the generated 3D skeleton graph data structure as input to a fingerprint function, and storing or transmitting the generated fingerprint representation together with the 3D skeleton data structure.

7. The method of claim 1, further comprising:

generating an estimate of a 3D silhouette for the aquatic animal from the 3D skeleton graph data structure;

estimating biomass of the aquatic animal based on the generated 3D silhouette; and storing or transmitting a value representative of the estimated biomass.

8. The method of claim 1, further comprising:

obtaining a plurality of 3D skeleton graph data structures generated from a sequence of 2D images;

analyzing the change in pose for the aquatic animal over time to determine if any motion, pose, or behavior can be classified as abnormal; and upon detection of abnormal motion, pose, or behavior, storing or transmitting a value representative of the classification as abnormal.

9. The method of claim 1, further comprising:

identifying a region of interest on an aquatic animal from the generated 3D skeleton graph data structure;

identifying a corresponding region in one of the 2D images of the aquatic animal; and searching the corresponding region in the 2D image for presence of a feature that is indicative of the presence of a corresponding object on the aquatic animal.

10. The method of claim 9, wherein the corresponding object is selected from the group consisting of: a deformity, a wound, an ulcer, an infection, a skin damage, a parasite, a sea lice, a plastic object, a fishing lines, and a tag.

11. A non-transitory computer-readable medium storing instructions enabling one or more processors to perform one of the methods of claim 1.

12. A system for generating a three-dimensional skeleton representation of an aquatic animal among a population of aquatic animals in an aquatic environment, comprising:

a device with two open ends connected by a channel and configured to receive water from the aquatic environment through the channel;

one or more cameras attached to the walls of the device and directed towards the interior of the device;

at least one processor configured to receive image data from the one or more cameras and to process the image data to:

identify key points on or inside the aquatic animal, including occluded key points, and their locations in the one or more 2D images;

generate one or more 2D skeleton graphs represented as nodes connected by edges, wherein each node in a 2D skeleton corresponds to one identified key point;

calculate estimated 3D positions for nodes in the one or more 2D skeleton graphs;

determine the 3D coordinates of the nodes of a 3D skeleton from the estimated 3D positions of the nodes of the one or more 2D skeletons, and generate 3D skeleton graphs as a pre-defined structure of nodes with 3D coordinate positions, connected by edges representing straight line distances between respective pairs of nodes;

store the 3D skeleton in a database as a representation of the individual aquatic animal or transmit the 3D skeleton as a data structure including the structure of nodes connected by edges;

estimate the biomass of the aquatic animal by performing mathematical operations on one or more of the nodes and one or more of the straight line distances in the stored or transmitted 3D skeleton graph; and track growth in the population based on biomasses estimated from respective 3D skeleton graphs generated at different times.

13. A system according to claim 12, wherein the device is configured to be submerged in the aquatic environment.

14. A system according to claim 12, wherein the device is configured to be provided in the vicinity of the aquatic environment and to allow water from the aquatic environment to be pumped through the channel.

15. A system according to claim 12, wherein the processor is configured to use a machine learning algorithm that has been trained on annotated image data of similar aquatic animals to identify key points on the aquatic animal.

16. A system according to claim 12, wherein the one or more camera is one camera, and the processor is further configured to calculate estimated 3D positions relative to a known position of the camera by defining a direction in 3D space from the known position of the camera to a position of a key point identified in a 2D image plane, and calculate a corresponding 3D position by matching possible positions along the defined direction and possible poses for the aquatic animal.

17. A system according to claim 12, wherein the one or more cameras are a plurality of cameras, and the processor is further configured to calculate estimated 3D positions relative to known positions of the plurality of cameras by detecting 2D positions of identified features in pairs of images obtained from pairs of cameras, and calculate corresponding 3D positions based on epipolar geometry.

18. A system according to claim 12, further comprising a plurality of light sources arranged to provide even illumination of objects inside the device.

19. A system according to claim 12, wherein the at least one processor is further configured to generate a fingerprint representation of an individual aquatic animal by delivering the generated 3D skeleton graph data structure as input to a fingerprint function, and storing or transmitting the generated fingerprint representation together with the 3D skeleton data structure.

20. A system according to claim 12, wherein the at least one processor is further configured to generate an estimate of a 3D silhouette for the aquatic animal from the 3D skeleton graph data structure, estimate biomass of the aquatic animal based on the generated 3D silhouette, and store or transmit a value representative of the estimated biomass.

21. A system according to claim 12, wherein the at least one processor is further configured to obtain a plurality of 3D skeleton graph data structures generated from a sequence of 2D images, analyze the change in pose for the aquatic animal over time to determine if any motion, pose, or behavior can be classified as abnormal, and upon detection of abnormal motion, pose, or behavior, storing or transmitting a value representative of the classification as abnormal.

22. A system according to claim 12, wherein the at least one processor is further configured to identify a region of interest on an aquatic animal from the generated 3D skeleton graph data structure, identify a corresponding region in one of the 2D images of the aquatic animal, and search the corresponding region in the 2D image for presence of a feature that is indicative of the presence of a corresponding object on the aquatic animal.

23. A system according to claim 22, wherein the corresponding object is selected from the group consisting of: a deformity, a wound, an ulcer, an infection, a skin damage, a parasite, a sea lice, a plastic object, a fishing lines, and a tag.

24. A system according to claim 12, wherein the one or more processors are at least two processors located at or configured to be located at at least two different locations, the at least two different locations being selected from the group consisting of: in or attached to the device, in a computing device in the vicinity of the aquatic environment, in a remote computer.

* * * * *